United States Patent
Ricketts (10) Patent No.: US 8,019,636 B2
(45) Date of Patent: Sep. 13, 2011

(54) METHOD, SYSTEM AND PROGRAM PRODUCT FOR PLANNING AND MANAGING A CALL CENTER STUDY

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1478 days.

(21) Appl. No.: 10/951,827

(22) Filed: Sep. 28, 2004

(65) Prior Publication Data

US 2006/0074700 A1    Apr. 6, 2006

(51) Int. Cl.
*G06Q 10/00*    (2006.01)

(52) U.S. Cl. ............... 705/7.29; 705/7.11; 705/7.32; 705/7.33

(58) Field of Classification Search ............... 705/10, 705/7.29, 7.31–7.33, 7.11; 715/700–715
See application file for complete search history.

(56) References Cited

U.S. PATENT DOCUMENTS

| | | | | |
|---|---|---|---|---|
| 5,325,292 | A * | 6/1994 | Crockett | 705/7.18 |
| 5,467,268 | A * | 11/1995 | Sisley et al. | 705/7.16 |
| 5,471,382 | A * | 11/1995 | Tallman et al. | 600/300 |
| 5,473,773 | A | 12/1995 | Aman et al. | |
| 5,918,017 | A | 6/1999 | Attanasio et al. | |
| 6,003,083 | A | 12/1999 | Davies et al. | |
| 6,044,355 | A * | 3/2000 | Crockett et al. | 705/8 |
| 6,205,412 | B1 * | 3/2001 | Barskiy et al. | 703/13 |
| 6,263,065 | B1 * | 7/2001 | Durinovic-Johri et al. | 379/266.03 |
| 6,353,667 | B1 * | 3/2002 | Foster et al. | 379/265.05 |
| 6,404,747 | B1 * | 6/2002 | Berry et al. | 370/270 |
| 6,442,583 | B1 | 8/2002 | Eilert et al. | |
| 6,480,600 | B1 * | 11/2002 | Neyman et al. | 379/265.09 |
| 6,728,748 | B1 | 4/2004 | Mangipudi et al. | |
| 6,760,775 | B1 | 7/2004 | Anerousis et al. | |
| 6,922,724 | B1 | 7/2005 | Freeman et al. | |
| 6,970,829 | B1 * | 11/2005 | Leamon | 705/9 |
| 7,020,619 | B2 * | 3/2006 | Thompson | 705/7.17 |
| 7,023,979 | B1 * | 4/2006 | Wu et al. | 379/265.11 |
| 7,103,562 | B2 * | 9/2006 | Kosiba et al. | 705/7.38 |
| 7,254,626 | B1 | 8/2007 | Kommula et al. | |
| 7,349,969 | B2 | 3/2008 | Gourlay et al. | |

(Continued)

OTHER PUBLICATIONS

Mehrotra, Vijay and Fama, Jason. "Call Center Simulation Modeling: Methods, Challenges, and Opportunities," 2003 Winter Simulation Conference, pp. 135-143.*

(Continued)

*Primary Examiner* — Lynda C Jasmin
*Assistant Examiner* — Alan Miller
(74) *Attorney, Agent, or Firm* — Anna L. Linne; Hoffman Warnick LLC (57) ABSTRACT

Under the present invention, a call center study is planned and managed. Specifically, a call center study is first designed based on specific parameters such as customer segments, products, call types and population size. Thereafter, target values and assumed resource values are provided so that a target sample size and a required resources value can be computed. The call center study can then be planned based on the target sample size and required resources. As the study is being performed, calls will be tracked and monitored so that actual sample sizes can be determined. These values will be used to compute actual accuracy levels for the study, which will be compared to a previously provided target accuracy level. Based on this comparison, it can be decided whether the study should be terminated or continued.

19 Claims, 5 Drawing Sheets

U.S. PATENT DOCUMENTS

| | | |
|---|---|---|
| 7,467,225 B2 | 12/2008 | Anerousis et al. |
| 7,478,051 B2 * | 1/2009 | Nourbakhsh et al. ........ 705/7.37 |
| 2001/0032120 A1 * | 10/2001 | Stuart et al. ..................... 705/11 |
| 2002/0062454 A1 | 5/2002 | Fung |
| 2002/0143597 A1 | 10/2002 | Andre et al. |
| 2002/0143599 A1 | 10/2002 | Nourbakhsh et al. |
| 2002/0147632 A1 | 10/2002 | Winham et al. |
| 2002/0175929 A1 | 11/2002 | Hunt et al. |
| 2002/0184069 A1 | 12/2002 | Kosiba et al. |
| 2003/0065548 A1 | 4/2003 | Schmidt |
| 2003/0088672 A1 | 5/2003 | Togasaki |
| 2003/0177182 A1 | 9/2003 | Clark et al. |
| 2003/0188208 A1 | 10/2003 | Fung |
| 2003/0196126 A1 | 10/2003 | Fung |
| 2003/0200473 A1 | 10/2003 | Fung |
| 2004/0122950 A1 | 6/2004 | Morgan et al. |
| 2004/0240635 A1 | 12/2004 | Bushey et al. |
| 2004/0266533 A1 | 12/2004 | Gentles et al. |
| 2005/0010682 A1 | 1/2005 | Amir et al. |
| 2005/0065831 A1 | 3/2005 | Keay et al. |
| 2006/0136479 A1 | 6/2006 | Fan et al. |

OTHER PUBLICATIONS

Klungle, Robert. "Simulation of CLaims Call Center: A Success and a Failure," 1999 Winter Simulation Conference, pp. 1648-1653.*

Gillis, U.S. Appl. No. 11/098,854, Office Action Communication, Dec. 21, 2010, 26 pages.

Gillis, U.S. Appl. No. 11/098,854, Office Action Communication, May 26, 2010, 28 pages.

Gillis, U.S. Appl. No. 11/098,854, Office Action Communication, Dec. 21, 2009, 26 pages.

Mina, U.S. Appl. No. 11/559,519, Office Action Communication, Apr. 6, 2011, 23 pages.

Mina, U.S. Appl. No. 11/559,519, Office Action Communication, Oct. 27, 2010, 22 pages.

* cited by examiner

FIG. 1

|  |  | Segments (customer, product) | | | | Totals |
|---|---|---|---|---|---|---|
|  |  | A | | B | | |
|  |  | A1 | A2 | B1 | B2 | |
| Call Types | Account Inquiry | 100,000<br>84<br>427<br>±4% | 100,000<br>84<br>128<br>±7% | 100,000<br>84<br>71<br>±10% | 100,000<br>84<br>73<br>±10% | 400,000<br>338<br>699<br>±3% |
|  | Sales | 100,000<br>84<br>32<br>±15% | 100,000<br>84<br>31<br>±15% | 100,000<br>84<br>5<br>±37% | 100,000<br>84<br>3<br>±47% | 400,000<br>338<br>71<br>±10% |
|  | Trouble | 100,000<br>84<br>248<br>±5% | 100,000<br>84<br>42<br>±13% | 100,000<br>84<br>8<br>±29% | 100,000<br>84<br>27<br>±16% | 400,000<br>338<br>325<br>±5% |
|  | Billing | 100,000<br>84<br>175<br>±6% | 100,000<br>84<br>78<br>±9% | 100,000<br>84<br>41<br>±13% | 100,000<br>84<br>70<br>±10% | 400,000<br>338<br>364<br>±4% |
|  | Activations | 100,000<br>84<br>106<br>±8% | 100,000<br>84<br>42<br>±13% | 100,000<br>84<br>3<br>±47% | 100,000<br>84<br>4<br>±41% | 400,000<br>338<br>155<br>±7% |
| Total population | | 500,000 | 500,000 | 500,000 | 500,000 | 2,000,000 |
| Total target sample | | 422 | 422 | 422 | 422 | 1,690 |
| Total actual sample | | 988 | 321 | 128 | 177 | 1,614 |
| Actual accuracy | | ±3% | ±5% | ±7% | ±6% | ±2% |

*Cell legend:*
Population size [calls per month] (entered)
Target sample size (computed)
Actual sample size (entered)
Actual accuracy (computed)

*Targets:*
90% confidence
±10% accuracy
20% unusable calls
(abandoned, refused, lost or non-classifiable)

1.64 z-value

FIG. 2

1,690 calls planned in total sample
6.00 calls per hour per person
6.00 hours per day per person
7.00 days in schedule for gathering data
=========
6.71 full-time equivalent resources (FTEs)

METHOD, SYSTEM AND PROGRAM PRODUCT FOR PLANNING AND MANAGING A CALL CENTER STUDY

BACKGROUND OF THE INVENTION

1. Field of the Invention

In general, the present invention provides a method, system and program product for planning and managing a call center study. Specifically, the present invention allows a call center study to be more effectively planned and managed in view of desired targets and available resources.

2. Related Art

In business and government, many organizations utilize a call center to handle communications with customers and citizens. Such call centers can send or receive many types of calls ranging from accounting/billing questions to product or service inquiries. However, due to their large requirements in terms of infrastructure and resources, many organizations have begun outsourcing their call centers to third party organizations. Two types of outsourcing commonly practiced are Business Process Outsourcing (BPO) and Business Transformation Outsourcing (BTO).

Under BPO, an outsourcer assumes the responsibility of performing one or more business processes that were previously done by the client company or another outsourcer. The business processes are typically changed only slightly, if at all, but lower labor rates generally enable an overall reduction in the cost of performing the business processes. To this extent, Information Technology (IT) may or may not play a significant role in reducing the cost of the outsourced business process.

In contrast, under BTO, business processes are also assumed by the outsourcer, but the business processes themselves may be substantially changed, often through IT and business process redesign. Before BTO agreements are reached, call center studies can be an important part of due diligence unless the client company and the outsourcer are willing to rely on industry benchmarks or previous engagements. However, given the changes to the business processes and IT that can occur during BTO, industry benchmarks and previous engagement may no longer be applicable.

For example, if BTO service level agreements are tied to a reduction in Average Handle Time (AHT) for calls as well as a reduction in cost per minute to handle calls, the outsourcer must understand both current and future AHT in order to quantify the expected savings. Likewise, if BTO service level agreements are tied to an increase in customer satisfaction, the outsourcer must understand what drives both current and future satisfaction in order to quantify the expected changes. However, neither AHT nor satisfaction changes for a particular client can be predicted accurately from industry benchmarks unless that client and the outsourcer are typical of clients and outsourcers included in the benchmarks, which is rarely the case. Accordingly, call center studies need to be performed to meet goals such as these. Unfortunately, no existing system provides a way to accurately plan and manage a call center study for either industry benchmarks or particular clients. To this extent, no existing system operates with an understanding of the factors that can influence various call center-related goals such as lowering AHT.

In view of the foregoing, there exists a need for a method, system and program product for planning and managing a call center study. Specifically, a need exists for a system whereby parameters such as target values can be input and used to statistically plan the call center study. A further need exists for actual values to be compared to the target values to determine the effectiveness and/or completion point of the call center study.

SUMMARY OF THE INVENTION

In general, the present invention provides a method, system and program product for planning and managing a call center study. Specifically, under the present invention, a call center study planner will first set up the call center study by providing a set (e.g., one or more) of customer segments, associated products and call types, as well as a population size for the study. Once these values have been provided, the planner will provide a target confidence level, a target accuracy level and a target unusable call level. Based on these target values, target samples size(s) can be computed. At this point the planner can decide to modify the call center study by eliminating and/or combining various elements of the study based on the target sample sizes and any practical calling limits that can be foreseen the planner may have. Thereafter, the planner will provide assumed values for calls per hour, hours per day and days in a schedule so that required resources (e.g., manpower) to perform the study can be calculated. Based on the target sample size(s), the required resources and any constraints, the planner can then plan a schedule for the call center study. As the study is being performed, actual sample size(s) will be tracked and used to determine actual accuracy level(s) for the call center study. Based on these values, a decision can be made as to whether the call center study should be continued or terminated.

A first aspect of the present invention provides a method for planning a call center study, comprising: receiving a set of customer segments, products and call types, and a population size for the call center study; receiving a target confidence level, a target accuracy level and a target unusable call level for the call center study, and computing a target sample size for the call center study based on the target confidence level, the target accuracy level and the target unusable call level; receiving assumed values for calls per hour, hours per day and days in a schedule, and computing required resources to perform the call center study based on the assumed values and the target sample size; planning a schedule for the call center study based on the required resources and any associated constraints; and receiving at least one actual sample size for call center study.

A second aspect of the present invention provides a computer-implemented method for planning a call center study, comprising: inputting customer segments, associated products and call types for the call center study into a tool; inputting a population size for the customer segments and the associated products for each of the call types into the tool; inputting a target confidence level, a target accuracy level and a target unusable call level for the call center study into the tool, and computing target sample sizes for the customer segments and the associated products for each of the call types with the tool; inputting assumed values for calls per hour, hours per day and days in a schedule into the tool, and computing required resources to perform the call center study based on the assumed values and the target sample sizes with the tool; planning a schedule for the call center study based on the required resources and any associated constraints using the tool; and monitoring actual calls and tracking actual sample sizes for the customer segments and associated products for each of the call types.

A third aspect of the present invention provides a system for planning a call center study, comprising: a parameter system for receiving a population size for the call center study; a target system for receiving a target confidence level, a target accuracy level and a target unusable call level for the call center study, and for computing a target sample size for the call center study; a resource system for receiving assumed values for calls per hour, hours per day and days in a schedule, and for computing required resources to perform the call center study based on the assumed values and the target sample size; a scheduling system for planning a schedule for the call center study based on the required resources and any associated constraints; and a study management system for receiving at least one actual sample size for call center study.

A fourth aspect of the present invention provides a program product stored on a recordable medium for planning a call center study, which when executed, comprises: program code for receiving a population size for the call center study; program code for receiving a target confidence level, a target accuracy level and a target unusable call level for the call center study, and for computing a target sample size for the call center study; program code for receiving assumed values for calls per hour, hours per day and days in a schedule, and for computing required resources to perform the call center study based on the assumed values and the target sample size; program code for planning a schedule for the call center study based on the required resources and any associated constraints; and program code for receiving at least one actual sample size for the call center study.

A fifth aspect of the present invention provides a system for deploying an application for planning a call center study, comprising: a computer infrastructure being operable to: receive a population size for the call center study; receive a target confidence level, a target accuracy level and a target unusable call level for the call center study, and compute a target sample size for the call center study; receive assumed values for calls per hour, hours per day and days in a schedule, and compute required resources to perform the call center study based on the assumed values and the target sample size; plan a schedule for the call center study based on the required resources and any associated constraints; and receive at least one actual sample size for the call center study.

A sixth aspect of the present invention provides a computer software embodied in a propagated signal for planning a call center study, the computer software comprising instructions to cause a computer system to perform the following functions: receive a population size for the call center study; receive a target confidence level, a target accuracy level and a target unusable call level for the call center study, and compute a target sample size for the call center study; receive assumed values for calls per hour, hours per day and days in a schedule, and compute required resources to perform the call center study based on the assumed values and the target sample size; plan a schedule for the call center study based on the required resources and any associated constraints; and receive at least one actual sample size for the call center study.

Therefore, the present invention provides a method, system and program product for planning and managing a call center study.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for planning and managing a call center study. Specifically, under the present invention, a call center study planner will first set up the call center study by providing a set (e.g., one or more) of customer segments, associated products and call types, as well as a population size for the study. Once these values have been provided, the planner will provide a target confidence level, a target accuracy level and a target unusable call level. Based on these target values, target samples size(s) can be computed. At this point the planner can decide to modify the call center study by eliminating and/or combining various elements of the study based on the target sample sizes and any practical calling limits that can be foreseen the planner may have. Thereafter, the planner will provide assumed values for calls per hour, hours per day and days in a schedule so that required resources (e.g., man-power) to perform the study can be calculated. Based on the target sample size(s), the required resources and any constraints, the planner can then plan a schedule for the call center study. As the study is being performed, actual sample size(s) will be tracked and used to determine actual accuracy level(s) for the call center study. Based on these values, a decision can be made as to whether the call center study should be continued or terminated.

Figure 1:
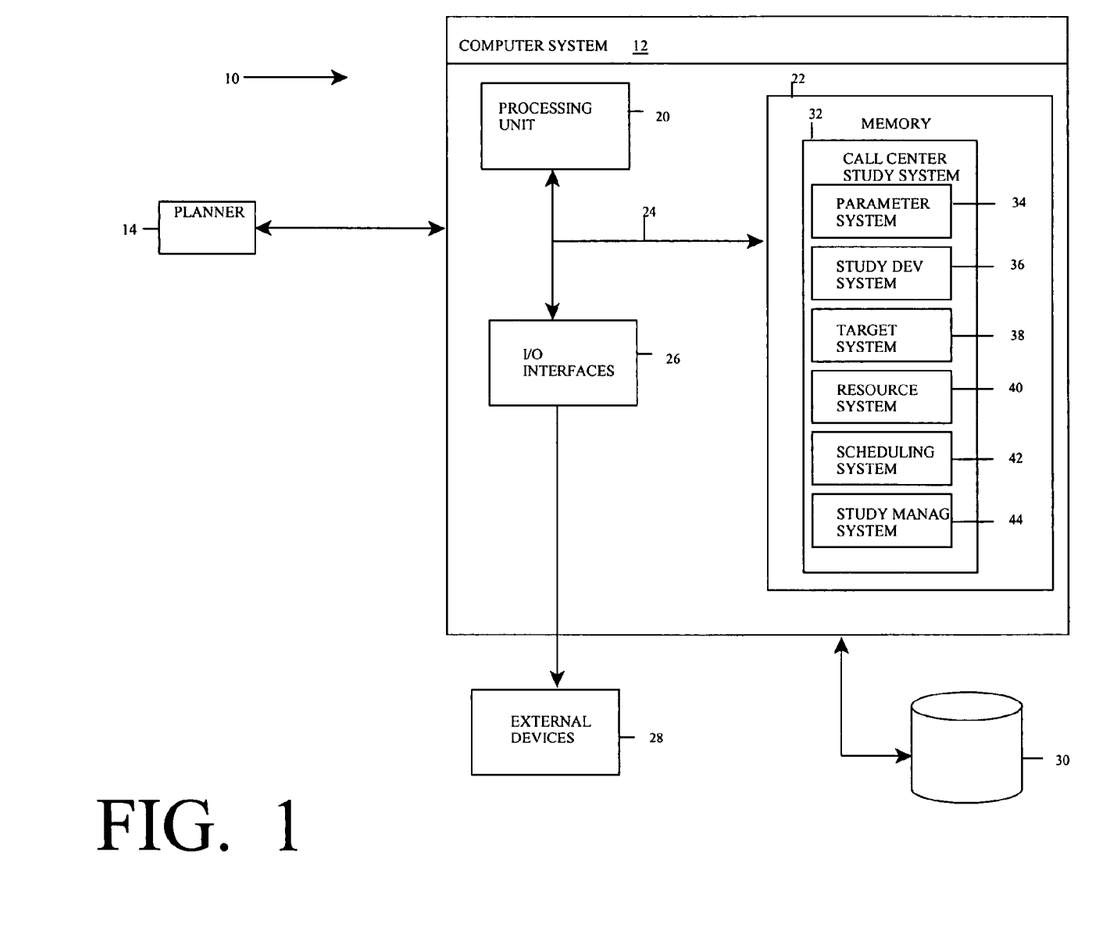
FIG. 1 depicts a system for planning and managing a call center study according to the present invention.

Referring now to FIG. 1, a system 10 for planning and managing a call center study according to the present invention is shown. In general, system 10 includes a computer system 12 having a computer-implemented tool/software program (call center study system 32). To plan and manage a call center study, planner 14 will input various values (which will be further described below). Based on the inputted values, certain calculations will be made so that the call center study can be planned and managed according to the resources and constraints of the corresponding entity (e.g., the business, organization for which the call center study is being performed). To this extent, planner 14 can be a representative of an entity seeking to perform a call center study, or planner 14 can be a representative of a third party company (e.g., an outsourcer/service provider) that will perform a call center study on behalf of an entity.

In general, computer system 12 is intended to represent any type of computerized device capable of carrying out the teachings of the present invention. For example, computer system 12 could be a desktop computer, a laptop computer, a hand held device, a workstation, a server, a client, etc. To this extent, it should also be appreciated that computer system 12 could be a stand-alone computer system as shown, or it could be implemented over a network such as the Internet, a local area network (LAN), a wide area network (WAN), a virtual private network (VPN), etc. In the case of the latter, planner 14 could utilize a separate computerized device (e.g., a client)

to interface with computer system 12 over the network. Moreover, communication through the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

In any event, computer system 12 generally includes processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. Such information could include, among other things, various values for planning a call center study, a schedule for the call center study, graphical/numerical representation of the call center study (e.g., a column-row matrix), etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 is call center study system 32 (hereinafter study system 32). As indicated above, study system 32 is a computer-implemented tool with which planner 14 will interface to plan and manage a call center study for a given entity. As shown, study system 32 includes parameter system 34, study development system 36, target system 38, resource system 40, scheduling system 42 and study management system 44. Each of these systems will be further described below, however, it should be understood that these systems typically provide planner 14 with any necessary interface pages for inputting and/or changing values or schedules.

When planner 14 initially desires to plan a call center study, planner 14 will first utilize parameter system 34 to input a set of customer segments and associated products for the entity, as well as a set of call types for each of the customer segments and associated products. Specifically, assume in an illustrative example that planner 14 is planning and managing a call center study for a telephone carrier. In such a case, illustrative customer segments could be land-line customers and cellular customers. Associated products for land-line customers could be local telephone plans and long distance telephone plans. Moreover, associated products for cellular telephone customers could be individual calling plans, and corporate calling plans. Illustrative call types that could be sent or received during the call center study for each of these parameters could include, for example, account inquiries, sales calls, trouble shooting calls, billing questions, and account activations. Since call centers can receive or send calls for multiple reasons, it is important to identify and track the various types of calls that can be held.

Once these parameters have been input by planner 14 (and received by parameter system 34), planner 14 can then input a population size therefor. For example, assume that the entity for which the call center study is being performed has a total of 100,000 customers for each product within each customer segment. In this case, planner 14 will input 100,000 accordingly. At this point, the basic framework for the call center study has been provided, and study development system 36 can develop a graphical/numerical representation therefor.

Figure 2:
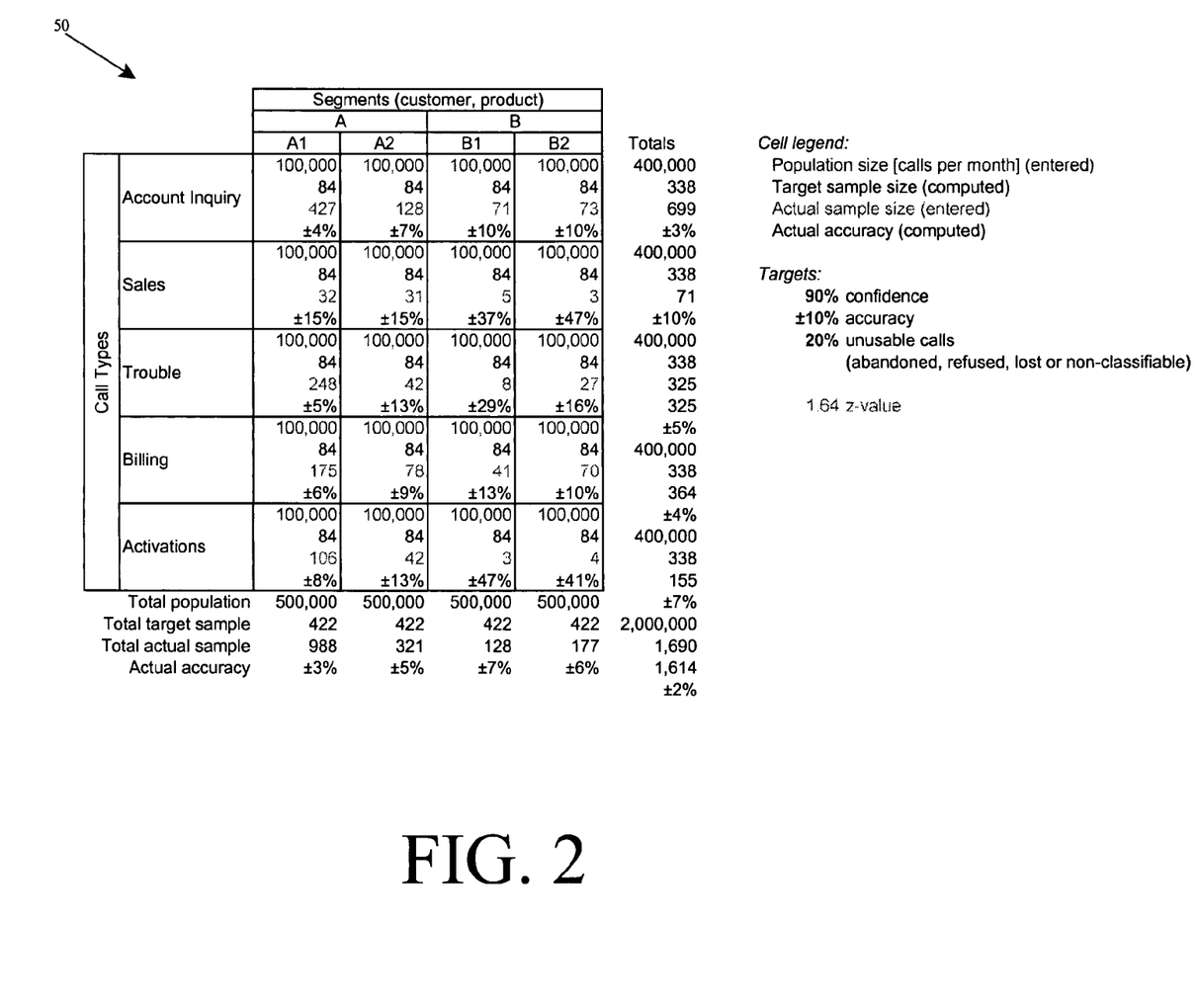
FIG. 2 depicts an illustrative matrix representation of a call center study according to the present invention.

In a typical embodiment, the representation developed by study development system 36 is a matrix of cells in a column-row format with the customer segments and associated products occupying the columns and the call types occupying the rows. Referring now to FIG. 2, an illustrative matrix 50 is depicted. It should be understood in advance that matrix 50 of cells in a column-row format is only intended as one possible way to represent the call center study. To this extent, any alternatives could be developed by study development system 36 (FIG. 1).

In any event, as depicted, customer segments A and B and associated products A1-A2 ands B1-B2 occupy the columns of matrix 50. For illustrative purposes, assume in this example that customer segment A pertains to cellular customers and that products A1 and A2 refer to individual calling plans and corporate calling plans, respectively. Similarly, assume that customer segment B pertains to land-line customers and that products B1 and B2 refer to local telephone plans and long distance telephone plans, respectively. Further assume that the rows of matrix 50 represent the illustrative call types mentioned above, namely, account inquiries, sales calls, trouble shooting calls, billing questions, and account activations.

As can be seen, each product of each customer segment has a cell for each call type. Initially, the cells will be blank with the exception of the population size (e.g., 100,000 inputted by planner 14 (FIG. 1). As planner 14 inputs additional values, and calculations are made based thereon, the cells will be further populated. For example, the next step is for planner 14 to input target values for the cells desired by the entity via target system 38 (FIG. 1). Typically, the target values include a target confidence level, a target accuracy level and a target unusable call level. Based on these target values, target system 38 will compute a target sample size. In general, the target sample size represents the number of calls that should be measured (inbound and/or outbound) during the call center study to achieve the target values input by planner 14. In a typical embodiment, planner will input one set of target values for computing a single target sample size that is populated into each cell. However, it should be appreciated that planner 14 could input different target levels for different cells, which would result in multiple target sample sizes.

In any event, assume in this example that planner 14 inputs a single set of target values comprising a target confidence level of 90%, a target accuracy level of +/−10%, and a target unusable call level of 20%, which resulted in a target sample size of 84 for all cells. In general, this computation is made using the following statistical Z-value algorithm:

target sample size=$((0.25*(Zvalue^2)*$populationSize$)/((0.25*(Zvalue^2))+((accuracyTarget^2)$ $*populationSize)))*(1/(1-unusablecallTarget))$.

Thus, planner 14 can select a Z-value (or one can be programmed into target system 38) to arrive at the target sample size. For the example shown in FIG. 2, a Z-value of 1.64 was used. The target sample size can also be computed using the following spreadsheet algorithm:

Target Sample Size=NORMSINV(confidenceTarget+ ((1−confidenceTarget)/2))

As generally known, the NORMSINV function of a spreadsheet program returns the inverse of the standard normal cumulative distribution, which has a mean of zero and standard deviation of one.

Regardless, once the target sample size has been populated into the cells of matrix 50 by target system 38 (FIG. 1), planner 14 can modify the call center study/matrix 50 as needed via study development system 36 (FIG. 1). Specifically, in modifying the call center study, planner 14 can eliminate or merge cells of matrix 50 for a variety of reasons. For example, if the entity does not expect to receive 84 activation calls for any of the products, planner 14 could eliminate the entire call type (e.g., the activation call type row) from matrix 50. Alternatively, if the entity does not expect to receive 84 activation calls for the land-line products, planner 14 could decide merge the local telephone plan cell (B1) with the long distance telephone plan cell (B2) for the activation call type, or eliminate one or both of these cells from matrix 50. This type of management is important in performing an accurate call center study.

After any such management has been performed, planner 14 will input some assumed values for performing the call center study via resource system 40 (FIG. 1) so that the resources required to perform the call center study can be computed. In general, the assumed values input by planner 14 include calls per hour, hours per day and days in a schedule. The assumed values can also include a number of calls per hour expected to be handled per person and a number of hours per day each person will be receiving calls. Once these values have been received, resource system 40 will compute the required resources (e.g., man-power).

Figure 3:
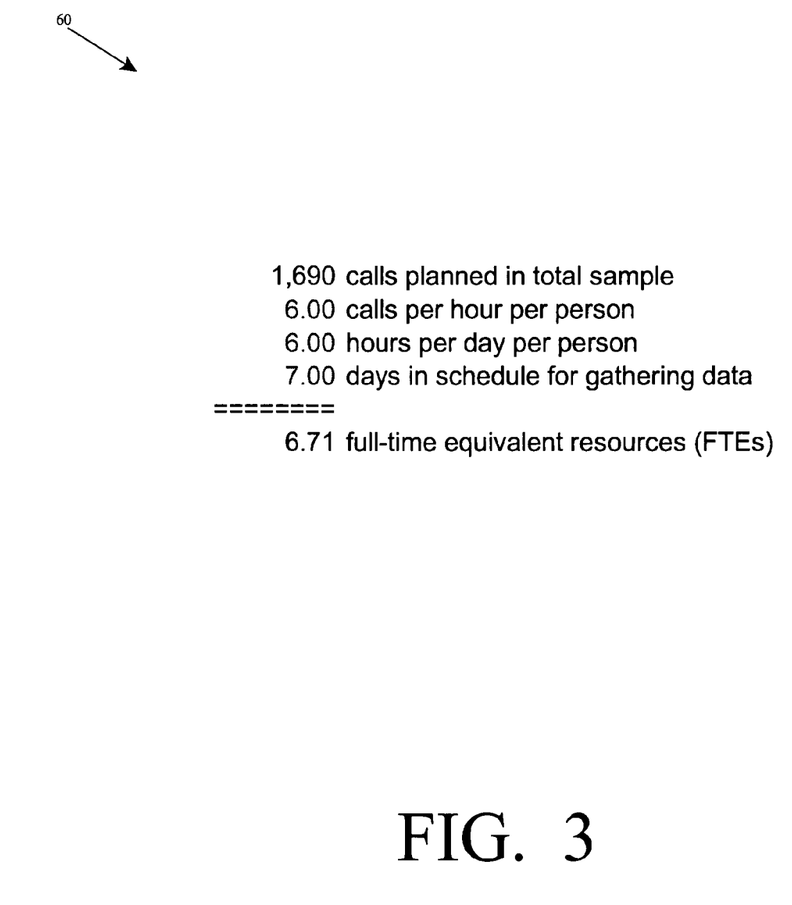
FIG. 3 depicts an illustrative required resources calculation according to the present invention.

Referring to FIG. 3, an illustration of this calculation is depicted. Specifically, resource system 40 will determine the product of the calls per hour per person, the hours per day per person and the days in the schedule (e.g., 6.0*6.0*7.0=252). Resource system 40 will then divide the total number of planned calls in the total sample by this value to arrive at the total number of full time equivalent resources (personnel) required to complete the study (e.g., 1690/252=6.71). If this value is not within the constraints of the entity, planner 14 can modify the call center study accordingly.

Figure 4:
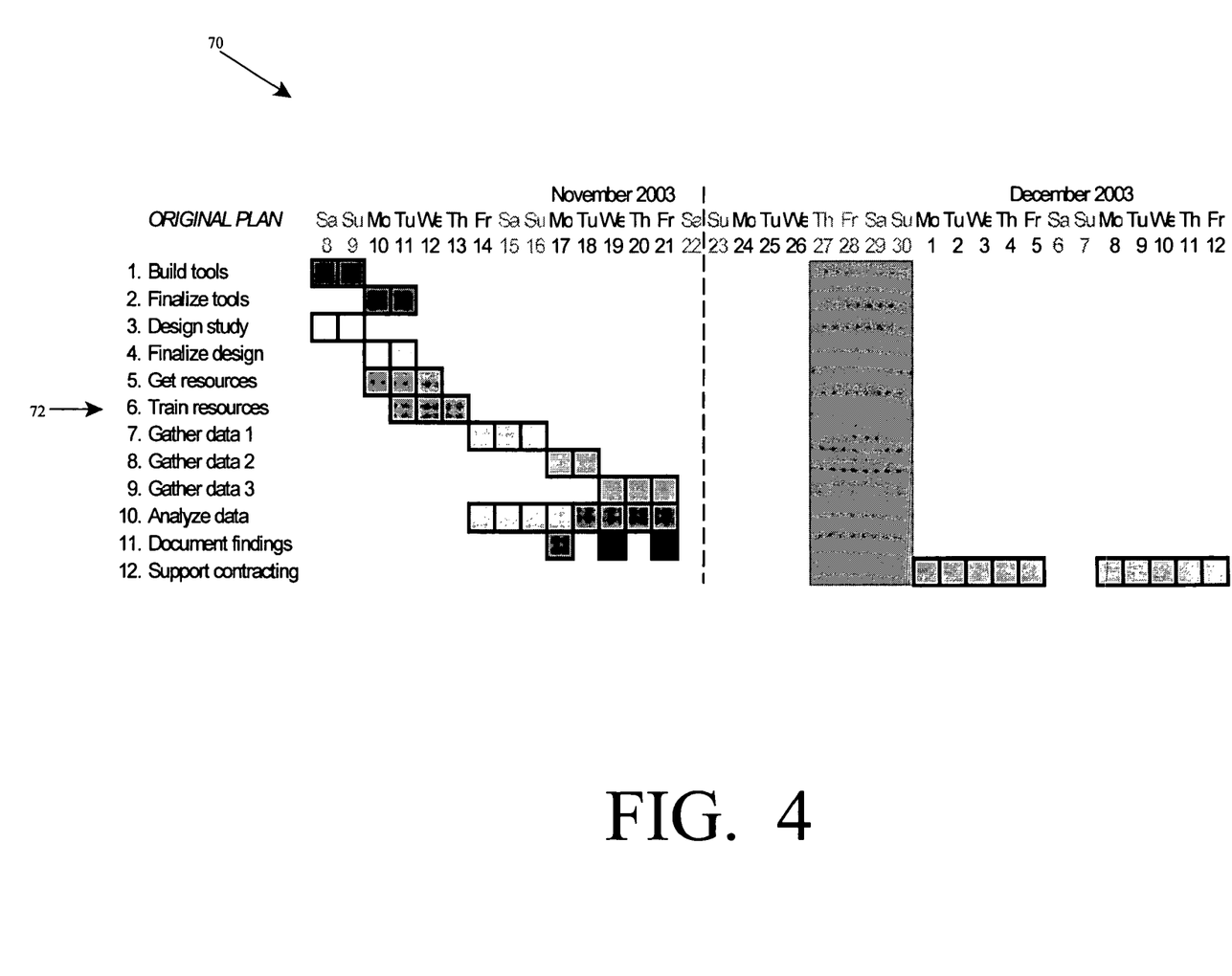
FIG. 4 depicts an illustrative planned schedule for a call center study according to the present invention.

At this point, planner 14 can then utilize scheduling system 42 (FIG. 1) to plan a schedule for the call center study. Referring to FIG. 4, an illustrative schedule 70 is shown. As depicted, schedule 70 can be broken out over a series of days, weeks, months, or even years. Schedule 70 can include all phases 72 of the call center study from building and designing tools, to gathering and analyzing data, to documenting the findings and support contracting. Planning schedule 70 also allows planner 14 to manage the call center study within any constraints and/or available resources of the entity. For example, planner 14 can attempt to fit the call center study that is being designed within any time frame or constraints of the entity. If, for some reason, the entity has certain time or resource constraints that do not fit within the schedule, planner 14 can modify schedule 70 or go back and modify the call center study accordingly. As indicated above, modification of the call center study can include merging or eliminating cells from matrix 50 (FIG. 2), and/or changing inputted values (e.g., target values, assumed values, etc.) so that the call center study will fit within the constraints of the entity.

Referring back to FIG. 2, once planner 14 (FIG. 1) has planned the schedule, the call center study will be held and actual calls will be tracked and monitored. Such calls can be in-bound calls or out-bound calls placed to customers, potential customers, survey participants, etc. Moreover, tracking and monitoring can be done according to any known technique. For example, live calls could be monitored, or calls could be recorded and computer screen replay technology could be utilized. Regardless, the schedule 70 (FIG. 3) can always be modified under the present invention to provide adequate coverage for tracking and/or monitoring calls.

Figure 5:
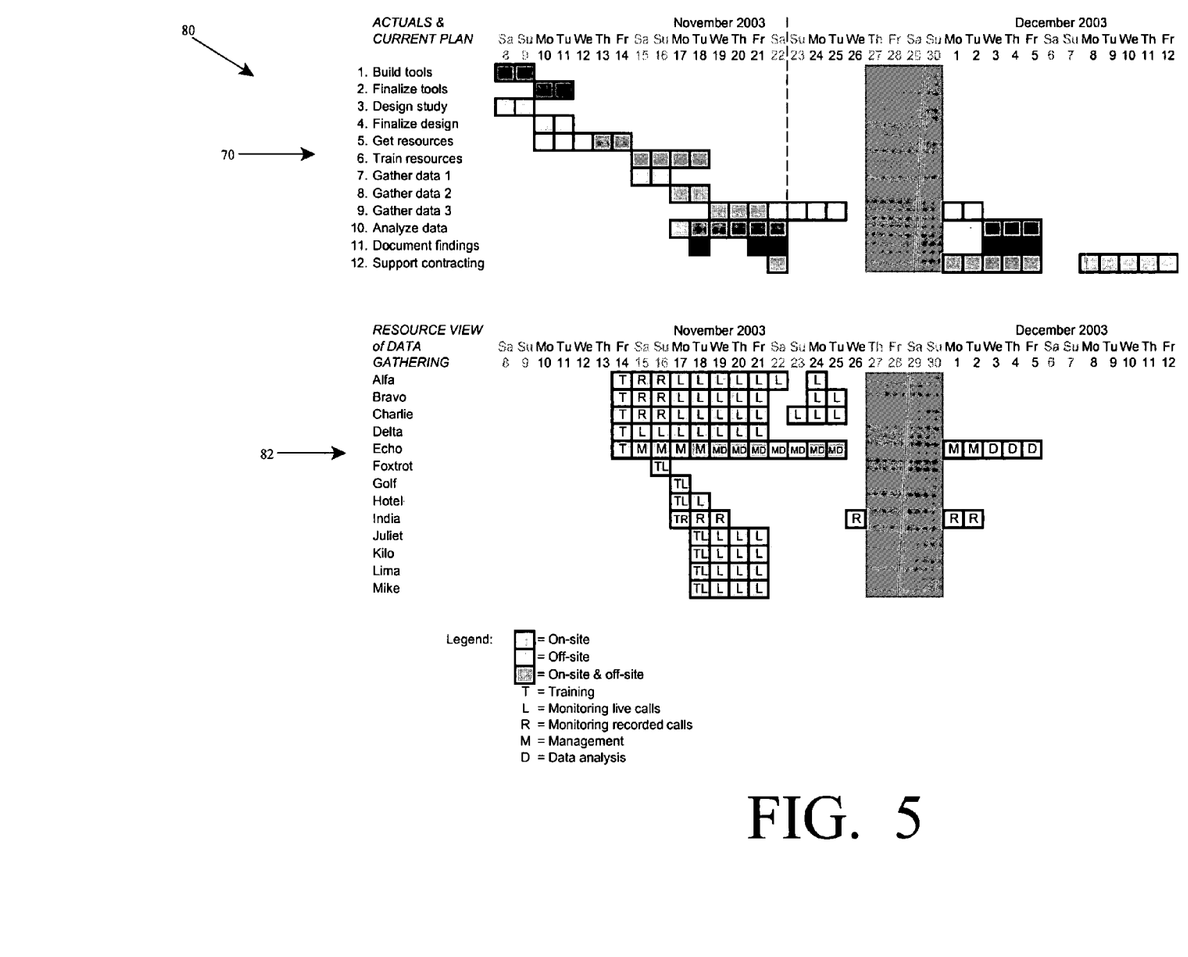
FIG. 5 depicts an illustrative tracking of a call center study according to the schedule of FIG. 4.

Referring now to FIG. 5, a plan 80 for tracking and monitoring calls according to schedule 70 of FIG. 4 is shown. As depicted, plan 80 shows a view 82 of the gathering data phase of schedule 70. View 82 sets forth the specific tracking mechanisms that will be utilized. For example, team "Alfa" will complete training on Friday November 14th, monitor recorded calls on Saturday November 15th and Sunday November 16th, and then monitor live calls from Monday November 17th through Saturday November 22nd and on Monday November 24th. In general, plan 80 allows the tracking and monitoring of calls to be effectively managed. It should be understood that similar to FIGS. 1-4, FIG. 5 is intended to be illustrative only. For example, any legend or methodology can be implemented for planning the tracking and monitoring of calls.

Regardless, as the calls are tracked, planner 14 will utilize study management system 44 (FIG. 1) to input values for actual sample size(s) (e.g., calls actually received/made), which will then be populated into the appropriate cells of matrix. For example, for cellular customers on individual calling plans (column A1), there were 427 account inquiry type of calls tracked during the call center study. As the values for actual calls are input, study management system 44 will use the Z-value algorithm to determine actual accuracy value for each of the cells. Specifically, the actual number of calls (sample size) will be plugged into the algorithm where target sample size was previously computed and the algorithm will then be used to solve for the actual accuracy level(s). Since the actual calls tracked can be different for each cell of matrix 50, the actual accurate levels can vary as well. For example, column A1 (e.g., individual calling plans for cellular customers) of matrix 50 has an actual accuracy level of +/−4% for the account inquire call type, an actual accuracy level of +/−15 for the sales inquiry call type.

After the actual accuracy levels have been computed and populated into the cells of matrix 50, a determination can be made as to whether the call center study should be continued or terminated. Specifically, the actual accuracy levels will be compared with the target accuracy level previously input by planner 14 (FIG. 1). Based on this comparison, planner 14 can decide whether more calls are needed and the study should be continued, or whether the study is in danger of being oversampled and should be terminated. For example, the actual accuracy level of +/−4% for the account inquire call type of column A1 is better than the target accuracy level of +/−10%. Thus, sufficient sample has occurred for this call type, and calls of this type no longer need to be tracked for this product. However, the sales inquire call type for column A1 only shows an actual accuracy of +/−15%, which is inferior to the target accuracy level of +/−10%. Thus, sampling for this call type for this column/product should continue to be tracked. Alternatively, the call center study could be scheduled for a particular period of time. When that point is reached, the study could be stopped to determine whether sufficient sampling (or over-sampling) has occurred (e.g., by comparing the accuracy values as discussed above).

As can be seen, the present invention solves many issues associated with call center study planning and management. For example, the present solves the following planning problems:

(1) How many calls should be sampled for each cell to achieve target levels of accuracy and confidence in the population parameter estimates.
(2) If the study design includes dimensions not under the control of planner, yet the distribution of calls across those dimensions can be estimated from existing data, what sample size on each of those dimensions must be planned to attain the target sample size in the cells likely to have the fewest calls.
(3) If abandoned or non-classifiable calls, refused out-bound calls, or lost calls are expected, and such calls will be discarded, how must the planned sample size per cell increased to achieve the target accuracy and confidence.
(4) Given the expected sample size for each cell and a practical upper bound on total sample size, how many cells can be included in the call center study design.
(5) If the total sample size will not support a full-factorial design, which cells will be merged or excluded from the study.
(6) Given a reasonable assumption about the number of calls that can be monitored per person per hour, the number of hours per day, and the number of days available for the study, how many resources will be needed to complete the study.
(7) Alternatively, if both the number of resources and days are limited, what is the projected total sample size and accuracy level.
(8) If live calls will be monitored, how should the schedule be laid out for adequate coverage of days of the week and hours of the day.
(9) If recorded calls will be monitored and computer screen replay technology is required, how should the schedule be laid out to enable use of that technology.

The present invention also solves the following call center study management problems:

(1) If the study design includes dimensions not under control of the researcher, when should the study stop sampling cells or dimensions.
(2) If the study must control sampling bias, when can the study stop sampling certain cells or dimensions.
(3) If live calls are monitored, and call volumes are lower on certain days or during certain time periods than planned, and the target sample size is not changed, how late will the study be completed.
(4) What effect does under or over sampling particular cells have on the accuracy level.
(5) If the study must protect only against downside risk (e.g., it only matters if the estimate of the population parameter is too low, not too high), is the high accuracy level attained with a given sample size sufficient.

It should be appreciated that the present invention could be offered as a business method on a subscription or fee basis. For example, computer system 12 and/or study system 32 of FIG. 1 could be created, supported, maintained and/or deployed by a service provider that offers the functions described herein for customers. That is, a service provider could offer to plan and manage a call center study as described above.

It should also be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of study system 32 of FIG. 1 is intended to be illustrative only. Moreover, the depiction of matrix 50 is intended to be illustrative as well.

I claim:

1. A method for planning a call center study, comprising:
receiving, on a computer device, a set of customer segments, a plurality of products for each customer segment of the set of customer segments, and a plurality of call types for each product of the plurality of products, and a population size for the call center study for a single call center, wherein the call types include a subject matter of a call chosen from the group consisting of: account inquiries, sales calls, trouble shooting calls, billing questions, and account activations;
developing, on the computer device, a matrix of cells representing the call center study in a column-row format based on the set of customer segments, products and call types, wherein each of the cells pertains to a single call type for a single customer segment and a single product;
receiving, on the computer device, a target confidence level, a target accuracy level and a target unusable call level for each of the call types for each of the plurality of products of the call center study, and computing on the computer device, a target sample size for each of the call types for each of the plurality of products of the call center study based on the target confidence level, the target accuracy level and the target unusable call level;
receiving, on the computer device, assumed values for calls per hour, hours per day and days in a schedule, and computing required resources to perform the call center study based on the assumed values and the target sample size;

planning, on the computer device, based on each of the receiving steps, a schedule for the call center study based on the required resources and any associated constraints and populating the matrix of cells based on each of the receiving steps;

receiving, on the computer device, at least one actual sample size for each of the call types for each of the plurality of products of the call center study and populating the matrix of cells with the at least one actual sample size;

computing, on the computer device, at least one actual accuracy level for each of the call types for each of the plurality of products of the call center study based on the at least one actual sample size;

comparing, on the computer device, the at least one actual accuracy level to the target accuracy level; and individually determining, on the computer device, whether to terminate or continue the call center study for each of the call types for each of the plurality of products based on the comparing.

2. The method of claim 1, further comprising modifying the call center study based on the target sample size and the constraints.

3. The method of claim 2, wherein the modifying step comprises an action selected from the group consisting of eliminating a call type from the call center study, eliminating a product from the call center study, and combining products for a customer segment.

4. The method of claim 1, wherein each of the cells of the matrix are populated throughout the call center study with the population size, at least one target sample size and the at least one actual sample size.

5. The method of claim 1, further comprising stopping the monitoring when the at least one actual sample size meets or exceeds the target sample size.

6. The method of claim 1, wherein the computing step is performed using a Z-value algorithm.

7. The method of claim 1, wherein the set of customer segments, products and call types, the population size, the target confidence level, the target accuracy level, the target unusable call level and the assumed values are received in a computer-implemented tool, and wherein the target sample size and the required resources are computed with the computer-implemented tool.

8. A computer-implemented method for planning a call center study, comprising:
   inputting a set of customer segments, a plurality of associated products for each customer segment of the set of customer segments and a plurality of call types for each of the products of the plurality of products for the call center study for a single call center into a tool on a computer device, wherein the call types include a subject matter of a call chosen from the group consisting of: account inquiries, sales calls, trouble shooting calls, billing questions, and account activations;
   developing a matrix of cells representing the call center study in a column-row format based on the set of customer segments, products and call types, wherein each of the cells pertains to a single call type for a single customer segment and a single product;
   inputting a population size for the customer segments and the associated products for each of the call types into the tool;
   inputting a target confidence level, a target accuracy level and a target unusable call level for the call center study into the tool, and computing, with the tool on the computer device, target sample sizes for each of the customer segments and the associated products for each of the call types with the tool;
   inputting assumed values for calls per hour, hours per day and days in a schedule into the tool, and computing required resources to perform the call center study based on the assumed values and the target sample sizes with the tool;
   planning, based on each of the inputting steps, a schedule for the call center study based on the required resources and any associated constraints using the tool;
   monitoring actual calls and tracking actual sample sizes for each of the customer segments and associated products for each of the call types, and computing with the tool on the computer device an actual accuracy level for each of the call types for each product for each customer segment based on the actual calls; and
   individually determining whether to terminate or continue the call center study for each of the call types for each of the plurality of products based on the monitoring and computing.

9. A system for planning a call center study, comprising:
   a parameter system for receiving a population size for the call center study for a single call center;
   a target system for receiving a target confidence level, a target accuracy level and a target unusable call level for the call center study, and for computing a target sample size for the call center study;
   a resource system for receiving assumed values for calls per hour, hours per day and days in a schedule, and for computing required resources to perform the call center study based on the assumed values and the target sample size;
   a scheduling system for planning a schedule, based on each of the receiving steps, for the call center study based on the required resources and any associated constraints;
   a study management system for receiving at least one actual sample size for call center study;
   a study development system for developing a matrix of cells representing the call center study in a column-row format based on a set of customer segments, products and call types, wherein the call types include a subject matter of a call chosen from the group consisting of: account inquiries, sales calls, trouble shooting calls, billing questions, and account activations, wherein each customer segment is associated with a plurality of products, and each product occupies a column, and each product is associated with a plurality of call types which each occupy a row of the matrix; and wherein the study development system further includes individually determining whether to terminate or continue the call center study for each of the call types for each of the plurality of products.

10. The system of claim 9, wherein each of the cells of the matrix are populated throughout the call center study with the population size, at least one target sample size and the at least one actual sample size.

11. The system of claim 9, wherein each of the cells of the matrix pertains to a single call type for a single customer segment and a single associated product.

12. The system of claim 9, wherein the study development system is further for altering the cells of the matrix based on the target sample size and the constraints.

13. The system of claim 9, wherein the study management system further calculates at least one actual accuracy level for the call center study based on the at least one actual sample size.

14. A program product stored on a computer-readable medium for planning a call center study, which when executed, comprises:
- program code for receiving a population size for the call center study for a single call center;
- program code for receiving a target confidence level, a target accuracy level and a target unusable call level for the call center study, and for computing a target sample size for the call center study;
- program code for receiving assumed values for calls per hour, hours per day and days in a schedule, and for computing required resources to perform the call center study based on the assumed values and the target sample size;
- program code for planning a schedule, based on each of the receiving steps, for the call center study based on the required resources and any associated constraints;
- program code for receiving at least one actual sample size for the call center study; and
- program code for developing a matrix of cells representing the call center study in a column-row format based on a set of customer segments, products and call types, wherein the call types include a subject matter of a call chosen from the group consisting of: account inquiries, sales calls, trouble shooting calls, billing questions, and account activations, wherein each customer segment is associated with a plurality of products, and each product occupies a column, and each product is associated with a plurality of call types which each occupy a row of the matrix, and wherein the program code is used for individually determining, on the computer device, whether to terminate or continue the call center study for each of the call types for each of the plurality of products.

15. The program product of claim 14, wherein each of the cells of the matrix are populated throughout the call center study with the population size, at least one target sample size and the at least one actual sample size.

16. The program product of claim 14, wherein each of the cells of the matrix pertains to a single call type for a single customer segment and a single product.

17. The program product of claim 14, further comprising program code for altering the cells of the matrix based on the target sample size and the constraints.

18. The program product of claim 14, further comprising program code for calculating at least one actual accuracy level for the call center study based on the at least one actual sample size.

19. A system for deploying an application for planning a call center study, comprising:
- a computer infrastructure being operable to:
  - receive a population size for the call center study for a single call center;
  - receive a target confidence level, a target accuracy level and a target unusable call level for the call center study, and compute a target sample size for the call center study;
  - receive assumed values for calls per hour, hours per day and days in a schedule, and compute required resources to perform the call center study based on the assumed values and the target sample size;
  - plan a schedule, based on each of the receiving steps, for the call center study based on the required resources and any associated constraints, wherein the planning is based on a set of customer segments, products and call types, wherein the call types include a subject matter of a call chosen from the group consisting of: account inquiries, sales calls, trouble shooting calls, billing questions, and account activations, wherein each customer segment is associated with a plurality of products, and each product occupies a column, and each product is associated with a plurality of call types which each occupy a row of the matrix; and
  - receive at least one actual sample size for the call center study, and wherein the sample size is used to individually determine whether to terminate or continue the call center study for each of the call types for each of the plurality of products.

\* \* \* \* \*